US012783655B1

(12) United States Patent
Gogela

(10) Patent No.: US 12,783,655 B1
(45) Date of Patent: Nov. 3, 2026

(54) DETECTION OF UNAUTHORIZED WORKLOADS IN CONTAINER ENVIRONMENTS

(71) Applicant: Trend Micro Incorporated, Tokyo (JP)

(72) Inventor: Jiri Gogela, Losina (CZ)

(73) Assignee: Trend Micro Incorporated, Tokyo (JP)

( * ) Notice: Subject to any disclaimer, the term of this patent is extended or adjusted under 35 U.S.C. 154(b) by 136 days.

(21) Appl. No.: 18/978,341

(22) Filed: Dec. 12, 2024

(51) Int. Cl.
*H04L 29/06* (2006.01)
*G06F 21/00* (2013.01)
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

2016/0081231 A1* 3/2016 Berke .................... G06F 1/206 361/679.54
2018/0181760 A1* 6/2018 Kumar ................. G06F 21/575
2021/0312037 A1* 10/2021 Revivo ................. G06F 21/577
2022/0019585 A1* 1/2022 Beresniewicz ....... G06F 16/212
2022/0300330 A1* 9/2022 White ................. G06F 12/0292
2024/0154987 A1* 5/2024 Rathor ................ H04L 63/1416
2024/0169062 A1* 5/2024 Lee ....................... G06F 21/554
2024/0256659 A1* 8/2024 Hyder ................... G06F 21/566
2026/0161792 A1* 6/2026 Gupta ................... G06F 21/577

OTHER PUBLICATIONS

"Dynamic Time Warping", Wikipedia, https://en.wikipedia.org/wiki/Dynamic_time_warping, Downloaded Nov. 30, 2024.
"A10 Tensor Core GPU", NVIDIA, https://www.nvidia.com/en-us/data-center/products/a10-gpu/, Downloaded Nov. 25, 2024.
JeremyMain, "GPUProfiler—Understand Your Application and Workflow Resource Requirements", GitHub, https://github.com/JeremyMain/GPUProfiler, Downloaded Nov. 22, 2024.

(Continued)

*Primary Examiner* — Lisa C Lewis
(74) *Attorney, Agent, or Firm* — Beyer Law Group

(57) ABSTRACT

Unauthorized workloads running in containers are detected based on hardware accelerator function calls made by the workloads. In one embodiment, a target workload is executed in a container within a container environment. Graphics Processing Unit (GPU) function calls made by the target workload are monitored, and a target execution profile is generated based on the monitored GPU function calls. The target execution profile is compared to reference execution profiles, which include execution profiles generated from GPU function calls of known unauthorized workloads. The target workload is determined to be unauthorized when the target execution profile matches a reference execution profile associated with a known unauthorized workload.

18 Claims, 6 Drawing Sheets

(56) References Cited

OTHER PUBLICATIONS

"AMD Radeon GPU Profiler", AMID GPUOpen, https://gpuopen.com/rgp/, Downloaded Nov. 22, 2024.
"OneAPI GPU Optimizatin Guide, GPU Analysis with Vtune TM Profiler", Intel, https:/lwww.intel.com/content/www/us/en/docsloneapiloptimization-guid~gpu/2023-0/gpu-analysis-with-vtunetm-profiler.html, Downloaded Nov. 22, 2024.
"Meta's Fleetwide Profiler Framework", GitHub, https://github.com/facebookincubator/strobelight, Downloaded Nov. 22, 2024.
"TensorFlow", Wikipedia, https://en.wikipedia.org/wiki/TensorFlow, Downloaded Nov. 25, 2024.
"ResNet-50 v1.5 for TensorFlow", GitHub, https://github.com/NVIDIA/DeepLearningExamples/blob/master/TensorFlow/Classification/ConvNets/resnet50v1.5/README.md, Downloaded Nov. 25, 2024.
"XMRig Malware", Check Point, https://www.checkpoint.com/cyber-hub/threat-prevention/what-is-malware/xmrig-malware/, Downloaded Nov. 25, 2024.

* cited by examiner

| WORKLOADS (@A10 G | llama_cpu _stress1.txt | llama_cpu _stress2.txt | llama_cpu _stress3.txt | llama2 .1.txt | llama2 .2.txt | llama2 .txt | nim2.txt | nim2 -cpu- | nim3.txt | tf _trivial.txt | tf _trivial2.txt | tf _trivial3.txt | tf2.txt | tf3.txt | tf4.txt | xmrig _ | xmrig 2.txt | xmrig 3.txt |
|---|---|---|---|---|---|---|---|---|---|---|---|---|---|---|---|---|---|---|
| llama_cpu_stress1.txt | 0.0 | 86.1 | 8.2 | 79.8 | 8.9 | 89.0 | 299.3 | 371.1 | 417.8 | 43.3 | 43.2 | 42.9 | 43.1 | 54.7 | 43.1 | 452.9 | 451.2 | 460.8 |
| llama_cpu_stress2.txt | 86.1 | 0.0 | 91.4 | 13.4 | 91.1 | 66.7 | 299.4 | 371.6 | 417.8 | 76.5 | 78.2 | 77.7 | 76.3 | 56.9 | 77.0 | 432.9 | 454.5 | 448.9 |
| llama_cpu_stress3.txt | 8.2 | 91.4 | 0.0 | 85.4 | 5.3 | 91.4 | 300.1 | 371.6 | 418.3 | 47.1 | 46.9 | 46.8 | 46.9 | 58.3 | 46.8 | 456.2 | 453.2 | 463.8 |
| llama2.1.txt | 79.8 | 13.4 | 85.4 | 0.0 | 85.0 | 68.6 | 299.0 | 371.3 | 417.5 | 69.9 | 72.3 | 70.9 | 69.8 | 54.5 | 71.0 | 436.0 | 454.9 | 450.3 |
| llama2.2.txt | 8.9 | 91.1 | 5.3 | 85.0 | 0.0 | 91.9 | 300.2 | 371.8 | 418.4 | 48.2 | 48.0 | 47.8 | 48.3 | 59.1 | 48.1 | 455.6 | 450.6 | 460.7 |
| llama2.txt | 89.0 | 66.7 | 91.4 | 68.6 | 91.9 | 0.0 | 300.1 | 371.7 | 418.3 | 76.8 | 78.2 | 78.2 | 76.4 | 56.8 | 77.0 | 474.4 | 485.5 | 490.0 |
| nim2.txt | 299.3 | 299.4 | 300.1 | 299.0 | 300.2 | 300.1 | 0.0 | 469.7 | 507.4 | 295.7 | 296.4 | 296.4 | 295.7 | 295.4 | 295.9 | 571.0 | 584.4 | 585.4 |
| nim2-cpu-stress.txt | 371.1 | 371.6 | 371.6 | 371.3 | 371.8 | 371.7 | 469.7 | 0.0 | 552.9 | 368.5 | 368.7 | 368.7 | 368.3 | 367.8 | 368.4 | 613.4 | 625.8 | 629.3 |
| nim3.txt | 417.8 | 417.8 | 418.3 | 417.5 | 418.4 | 418.3 | 507.4 | 552.9 | 0.0 | 415.5 | 415.7 | 415.7 | 415.4 | 414.9 | 415.5 | 641.0 | 653.3 | 655.6 |
| tf_trivial.txt | 43.3 | 76.5 | 47.1 | 69.9 | 48.2 | 76.8 | 295.7 | 368.5 | 415.5 | 0.0 | 8.0 | 7.6 | 7.6 | 32.7 | 7.7 | 496.6 | 496.3 | 506.9 |
| tf_trivial2.txt | 43.2 | 78.2 | 46.9 | 72.3 | 48.0 | 78.2 | 296.4 | 368.7 | 415.7 | 8.0 | 0.0 | 6.2 | 8.6 | 34.6 | 8.0 | 497.3 | 497.5 | 508.5 |
| tf_trivial3.txt | 42.9 | 77.7 | 46.8 | 70.9 | 47.8 | 78.2 | 296.4 | 368.7 | 415.7 | 7.6 | 6.2 | 0.0 | 7.7 | 34.3 | 6.8 | 496.6 | 495.3 | 506.2 |
| tf2.txt | 43.1 | 76.3 | 46.9 | 69.8 | 48.3 | 76.4 | 295.7 | 368.3 | 415.4 | 7.6 | 8.6 | 7.7 | 0.0 | 32.2 | 5.8 | 496.3 | 497.9 | 508.2 |
| tf3.txt | 54.7 | 56.9 | 58.3 | 54.5 | 59.1 | 56.8 | 295.4 | 367.8 | 414.9 | 32.7 | 34.6 | 34.3 | 32.2 | 0.0 | 33.1 | 478.7 | 487.9 | 494.7 |
| tf4.txt | 43.1 | 77.0 | 46.8 | 71.0 | 48.1 | 77.0 | 295.9 | 368.4 | 415.5 | 7.7 | 8.0 | 6.8 | 5.8 | 33.1 | 0.0 | 496.9 | 498.7 | 509.1 |
| xmrig_cpu_stress1.txt | 452.9 | 432.9 | 456.2 | 436.0 | 455.6 | 474.4 | 571.0 | 613.4 | 641.0 | 496.6 | 497.3 | 496.6 | 496.3 | 478.7 | 496.9 | 0.0 | 314.8 | 284.3 |
| xmrig2.txt | 451.2 | 454.5 | 453.2 | 454.9 | 450.6 | 485.5 | 584.4 | 625.8 | 653.3 | 496.3 | 497.5 | 495.3 | 497.9 | 487.9 | 498.7 | 314.8 | 0.0 | 95.7 |
| xmrig3.txt | 460.8 | 448.9 | 463.8 | 450.3 | 460.7 | 490.0 | 585.4 | 629.3 | 655.6 | 506.9 | 508.5 | 506.2 | 508.2 | 494.7 | 509.1 | 284.3 | 95.7 | 0.0 |

FIG. 4

DETECTION OF UNAUTHORIZED WORKLOADS IN CONTAINER ENVIRONMENTS

TECHNICAL FIELD

The present disclosure is directed generally to cybersecurity, and more particularly but not exclusively to detection of unauthorized workloads in container environments.

BACKGROUND

Container environments, such as those based on the Docker™ containerization platform, have become foundational technologies for deploying and managing modern applications. Containers provide lightweight, portable, and isolated environments for running diverse workloads, ranging from web services to computational tasks in data analytics and machine learning. Their portability and resource efficiency have made them indispensable in enterprise and cloud computing. However, the same features that make containers attractive also make them a potential vector for misuse. Malicious actors can exploit container environments to execute unauthorized workloads, such as cryptocurrency mining, often consuming valuable system resources without detection.

The isolation and abstraction inherent to containers pose challenges for detecting unauthorized workloads, as they obscure the underlying processes and resource consumption from traditional monitoring tools. Unauthorized workloads often operate in a way that appears similar to legitimate tasks, further complicating detection. Ensuring the integrity and security of container environments requires mechanisms to identify such unauthorized workloads, preserving system resources and preventing exploitation.

BRIEF SUMMARY

Unauthorized workloads running in containers are detected based on hardware accelerator functions called by the workloads. In one embodiment, a target workload is executed in a container within a container environment. Graphics Processing Unit (GPU) function calls made by the target workload are monitored, and a target execution profile is generated based on the monitored GPU function calls. The target execution profile may reflect the number of calls to distinct GPU functions during predefined time intervals. The target execution profile is compared to a plurality of reference execution profiles, which include execution profiles generated from GPU function calls of known unauthorized workloads. The target workload is determined to be unauthorized when the target execution profile matches a reference execution profile associated with a known unauthorized workload.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 shows a distance matrix of execution profiles of various workloads, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
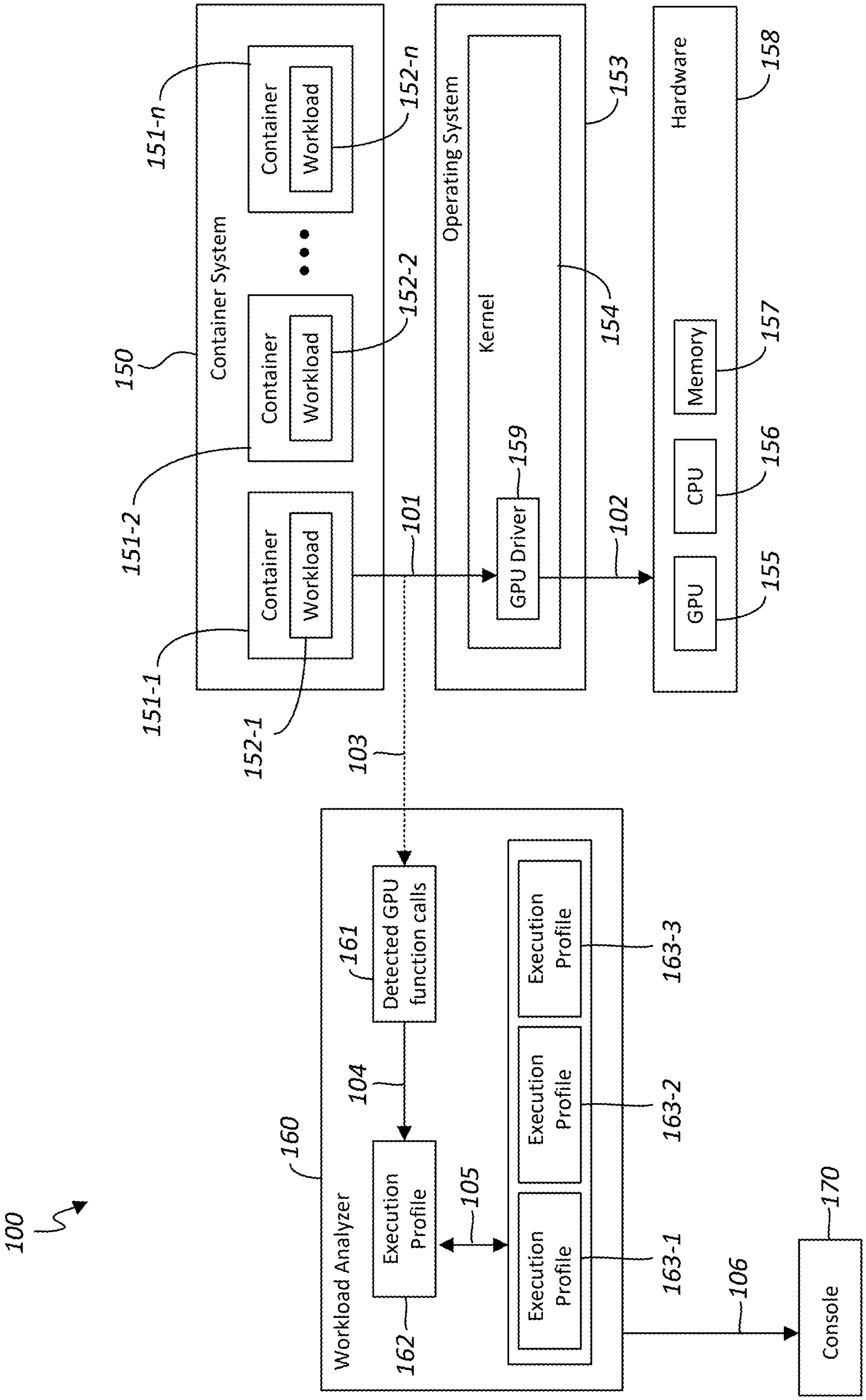
FIG. 1 shows a block diagram of a computing environment, in accordance with an embodiment of the present invention.

FIG. 1 shows a block diagram of a computing environment 100, in accordance with an embodiment of the present invention. The computing environment 100 may be implemented in a cloud computing platform, such as the Amazon Web Services (AWS)™ platform. More specifically, a container system 150, operating system 153, and workload analyzer 160 may be running on hardware 158 of the cloud computing platform. As can be appreciated, the computing environment 100 may also be implemented in other configurations, such as a dedicated server computer, interconnected computers, or other computer systems.

A workload refers to one or more computational tasks, processes, or operations executed within a container. The workload represents an application or service encapsulated by the container and consumes system resources, such as central processing units (CPUs), memory, storage, and hardware accelerators, including graphics processing units (GPUs) and neural processing units (NPUs). A workload in a container is typically isolated from other workloads and operates independently to achieve specific functional objectives, such as data processing, machine learning, or application execution. In the example of FIG. 1, a container system 150 provides a container environment that allows workloads 152 (i.e., 152-1, 152-2, . . . , 152-*n*) to be executed in corresponding containers 151 (i.e., 151-1, 151-2, . . . , 151-*n*). The container system 150 may be implemented using a conventional containerization platform, such as the Docker™ platform. The containers 151 execute under a common operating system 153. The hardware 158 comprises one or more GPUs 155, CPUs 156, memory 157, and other computer hardware components that enable execution of software components, including the container system 150, operating system 153, and workload analyzer 160.

A GPU has a plurality of predetermined functions that can be invoked by a workload. For example, the workload 152-1 running in the container 151-1 may call a GPU function to perform a GPU operation. The function call is ultimately received and processed by a kernel GPU driver 159 executed by the kernel 154 of the operating system 153. The GPU driver 159 interacts with the GPU to perform an operation in accordance with the function call. As a particular example, a workload 152-1 that is running in the container 151-1 may call a GPU function, which is received by the GPU driver 159 (see arrow 101). In response, the GPU driver 159 interacts with the GPU 155 (see arrow 102), which operates in accordance with the GPU function.

A GPU is an expensive hardware resource. That is, the cost of purchasing, configuring, and running GPUs is significant. Unfortunately, users may utilize a GPU in conjunction with a workload that is not authorized to be run in a corresponding container. For example, the computing environment 100 may be that of a company, and an employee of the company may run, in violation of company policies, a personal cryptocurrency mining workload in a container 151. The GPU may also be utilized by malware that runs as a workload in a container 151.

Authorized (i.e., legitimate) and unauthorized workloads may be defined by the owner of the container. For example, a company that operates a container environment may specifically consider malware and cryptocurrency mining to be unauthorized. The company may also specify particular workloads to be authorized.

The workload analyzer 160 is configured to determine whether a workload is unauthorized or authorized based on the execution profile of the workload. In one embodiment, an execution profile of a workload is based on GPU function calls made by the workload. Embodiments of the present invention are especially effective in detecting unauthorized workloads in container environments because workloads are isolated from one another, enabling GPU function calls to be readily attributed to specific workloads Execution profiles of known authorized workloads and known unauthorized workloads may be stored as reference execution profiles. The reference execution profiles may be defined and provided by a cybersecurity vendor. The reference execution profiles may also be generated by running known authorized workloads and known unauthorized workloads, monitoring GPU function calls made by the workloads, and generating the reference execution profiles from the GPU function calls made by the workloads. An execution profile of a workload may be compared to the reference execution profiles to determine whether the workload is authorized or unauthorized.

In one embodiment, the workload analyzer 160 monitors the workloads 152 for GPU function calls, records detected GPU function calls made by the workloads 152, and generates corresponding execution profiles based on the detected GPU function calls. In one embodiment in which the operating system 153 is the Linux operating system, GPU function calls made by the workloads 152 are monitored and recorded using the Extended Berkeley Packet Filter (eBPF). GPU function calls made by a workload running in a container may also be monitored and recorded using other conventional monitoring techniques.

In the example of FIG. 1, the workload analyzer 160 monitors and records the GPU function calls made by the workload 152-1 (see arrow 103), generates a target execution profile 162 from the GPU function calls made by the workload 152-1 (see arrow 104), and compares the target execution profile 162 to the reference execution profiles 163 (e.g., 163-1, 163-2, 163-3, etc.) (see arrow 105). The reference execution profiles 163 are execution profiles of known authorized workloads and known unauthorized workloads. The workload 152-1 is classified as unauthorized when the target execution profile 162 matches a reference execution profile 163 that is associated with a known unauthorized workload, is classified as authorized when the target execution profile 162 matches a reference execution profile 163 that is associated with a known authorized workload, and is classified as unknown when the target execution profile does not match any of the reference execution profiles 163. As can be appreciated, a "match" does not necessarily have to be an exact match; the level of matching depends on the particulars of the comparison metric and the algorithm for generating the execution profile. As a particular example, a target execution profile may be considered to be matching a reference execution profile when they are similar, e.g., within a similarity threshold.

The workload analyzer 160 may perform a mitigation action responsive to detecting an unauthorized or unknown workload. The mitigation action may be based on predetermined security policies. For example, a security policy may indicate terminating unauthorized or unknown workloads. In the example of FIG. 1, responsive to detecting that the workload 152-1 is unauthorized, the workload 160 may raise an alert by sending a report to a console 170 (see arrow 106). The console 170 may be a system interface, application, or service that receives and displays reports or alerts regarding detected unauthorized workloads. The console 170 enables users or other systems to access, analyze, and respond to the reported information. The console 170 may be running on the same computer system as the workload analyzer 160. The console 170 may also be on a separate computer system that communicates with the workload analyzer 160 over a computer network.

In one embodiment, an execution profile has the following format:

$$F = \begin{bmatrix} f_{1,1} & \cdots & f_{1,60} \\ \vdots & \ddots & \vdots \\ f_{41,1} & \cdots & f_{41,60} \end{bmatrix} \in \mathbb{N}^{41\times 60}$$

where F is a two-dimensional matrix representing the execution profile, and $f_{m,n}$ is an integer number representing the number of calls to a monitored GPU function m within a time interval n. In one embodiment, the time interval duration is 1 second, and there are 41 distinct GPU functions that are monitored. For example, $f_{1,1}$ is a number of function calls to a first GPU function during the first 1-second time interval; $f_{1,2}$ is a number of function calls to the first GPU function during a second 1-second time interval that immediately follows the first 1-second time interval; $f_{2,1}$ is a number of function calls to a second GPU function in the first 1-second time interval; $f_{2,2}$ is a number of function calls to the second GPU function in the second 1-second time interval immediately following the first 1-second time interval; etc. The monitored GPU functions are distinct, different GPU functions.

In one embodiment, the time intervals during which the number of calls to the monitored GPU functions are counted are relative to a time t0, which starts in response to detecting the first-called GPU function. As a particular example, assume calls to a GPU function_A are detected first at time 0.2 sec, then at 0.5 sec, 1.3 sec, 1.4 sec, 1.9 sec, and 3.5 sec., and the GPU function_A is the first among a plurality GPU functions called by the workload. Given a time interval n of 1 second, the row of the matrix F for the GPU function_A will have the following count values [2, 3, 0, 1], i.e., 2 function calls during the first time interval, 3 function calls during the second time interval, 0 function calls during the third time interval, 1 function call during the fourth time interval, etc. The function call counts for the other GPU functions are indicated the same way in the matrix F and counted in time intervals beginning at time 0.2 sec.

As can be appreciated, the number of distinct GPU functions to monitor and the duration of the time interval may vary depending on the particulars of the implementation. Also, function symbol names do not need to be identified or enumerated explicitly, as they may vary depending on the GPU type and driver version.

Figure 2:
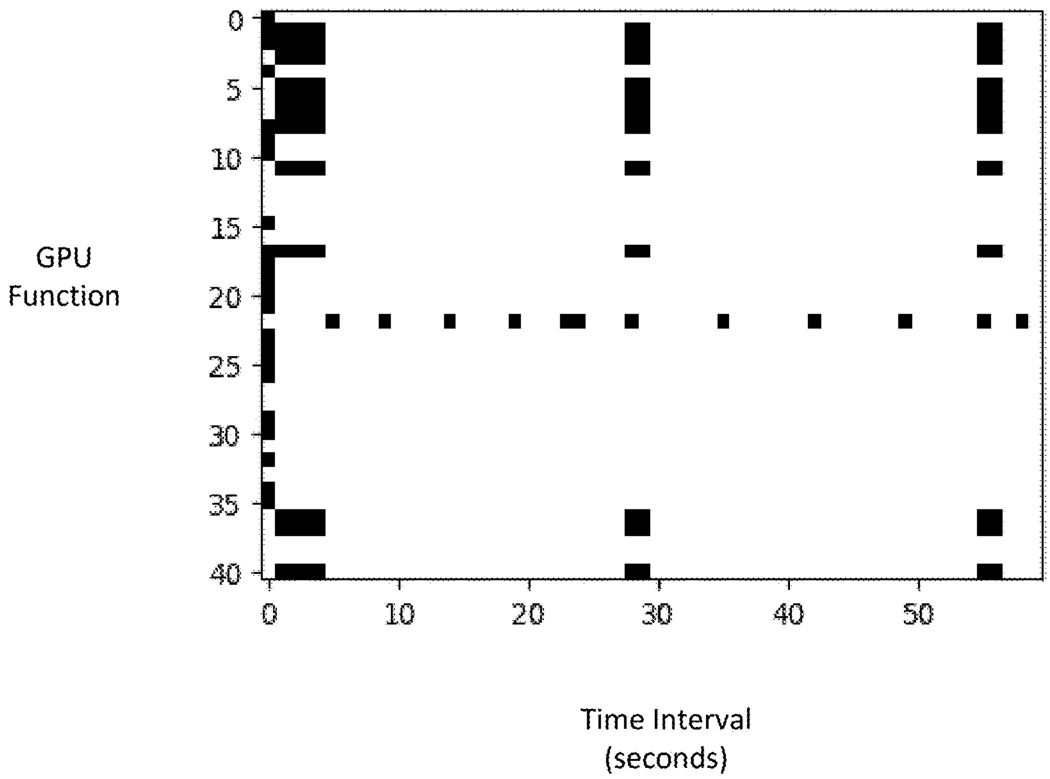
FIGS. 2 and 3 show visual representations of execution profiles, in accordance with an embodiment of the present invention.
Figure 3:
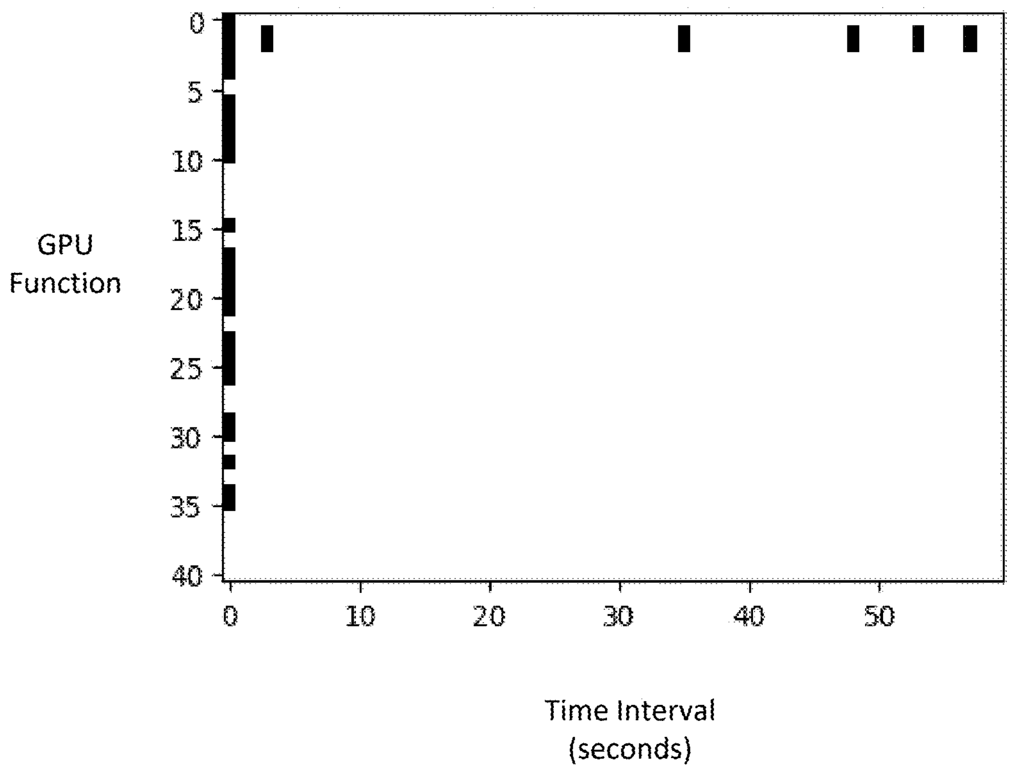

FIGS. 2 and 3 are visual representations of execution profiles of workloads, in accordance with an embodiment of the present invention. In the example of FIGS. 2 and 3, the y-axis (i.e., vertical axis) represents 41 different GPU functions of an NVIDIA™ GPU, and the x-axis (i.e., horizontal axis) represents 60 1-second time intervals. Each (x, y) datapoint represents a GPU function call count. That is, (0,0) represents the number of times a first GPU function was called during a first 1-second time interval; (1,0) represents the number of times the first GPU function was called during a second 1-second time interval; (2,0) represents the number of times the first GPU function was called during a third 1-second time interval; (0,1) represents the number of times a second GPU function was called during the first 1-second time interval; (1,1) represents the number of times the second GPU function was called during the second 1-second time interval; (2,1) represents the number of times the second GPU function was called during the third 1-second time interval; etc. The function call count is a numerical value, but is shown in FIGS. 2 and 3 as a black point when the function call count is equal to or greater than one for clarity of illustration. As can be appreciated, the function call count may be represented in a visualization by color code, actual value, etc. depending on the particulars of the visualization.

FIG. 2 shows a visual representation of an execution profile for the XMRig cryptocurrency mining workload, whereas FIG. 3 shows a visual representation of an execution profile for the TensorFlow Resnet50 workload. The TensorFlow Resnet50 workload is considered an authorized workload in that it is typically employed in legitimate artificial intelligence and machine learning applications. On the other hand, the XMRig cryptocurrency mining workload is considered an unauthorized workload in that it is typically associated with malware. As shown in FIGS. 2 and 3, the execution profile of the XMRig cryptocurrency mining workload is very different from that of the TensorFlow Resnet50 workload, allowing the two workloads to be identified and distinguished based on their execution profiles.

In one embodiment, execution profiles are compared by Dynamic Time Warping (DTW). For example, a DTW value may be calculated for each time series of function calls of an execution profile, and all of the DTW values may be summed to generate a profile score for the execution profile. The distance between profile scores may be calculated to determine similarity of two execution profiles; the shorter the distance, the more similar the two execution profiles. As a particular example, a DTW value may be calculated for each row of the above-described matrix F of an execution profile, and the DTW values of all rows of the matrix F may be summed to generate the profile score of the execution profile. The difference between profile scores of two execution profiles is the distance between the two execution profiles. The distance may be compared to a similarity threshold to determine whether or not the two execution profiles are similar. As can be appreciated, the metric for comparing execution profiles depends on the particulars of the execution profile.

FIG. 4 shows a distance matrix of execution profiles of various workloads running in containers, in accordance with an embodiment of the present invention. The example of FIG. 4 is from testing various workloads that make function calls to an NVIDIA™ A10 GPU. In the example of FIG. 4:

(a) "llama2.txt", llama2.1.txt", and "llama2.2.txt" each represents a container running inference of the llama 2 Large Language Model (LLM) model;

(b) "llama_cpu_stress1.txt", "llama_cpu_stress2.txt", and "llama_cpu_stress3.txt" each represents a container running inference of the llama 2 LLM model during high CPU stress;

(c) "nim2.txt" and "nim3.txt" each represents a container running the NIM (Nvidia™ NIM microservices) inference;

(d) "nim2-cpu-stress.txt" represents a container running the NIM inference during high CPU stress;

(e) "tf_trivial.txt", "tf_trivial2.txt", and "tf_trivial3.txt" each represents a container running TensorFlow model training operations (trivial model);

(f) "tf2.txt", "tf3.txt", and "tf4.txt" each represents a container running TensorFlow model training operations (model Resnet50);

(g) "xmrig2.txt" and "xmrig3.txt" each represents a container running the XMRig cryptocurrency mining software; and (f) "xmrig_cpu_stress1.txt" represents a container running the XMRig cryptocurrency mining software during high CPU stress.

In the example of FIG. 4, the distance values between execution profiles of workloads are calculated by generating a profile score for each execution profile, and calculating the difference between profile scores to generate the corresponding distance value. For example, the distance between "llama2.1.txt" and "tf_trivial.txt" is "69.9", and the distance between "xmrig3.txt" and "llama2.1.txt" is "450.3"; each of these distance values is highlighted with a dashed box in FIG. 4 for ease of reference. In the example of FIG. 4, the distances between execution profiles of the llama workloads and TensorFlow workloads are relatively short, indicating strong similarity between llama and TensorFlow workloads. On the other hand, there is a relatively long distance between execution profiles of llama, NIM, and XMRig workloads.

The distance values in the example of FIG. 4 are from execution profiles that indicate the number of times a particular GPU function is called during time intervals. Accuracy of workload detection may be further improved by monitoring additional GPU functions and by including additional GPU-related information (e.g., function call parameters and data) in the execution profiles.

Figure 5:
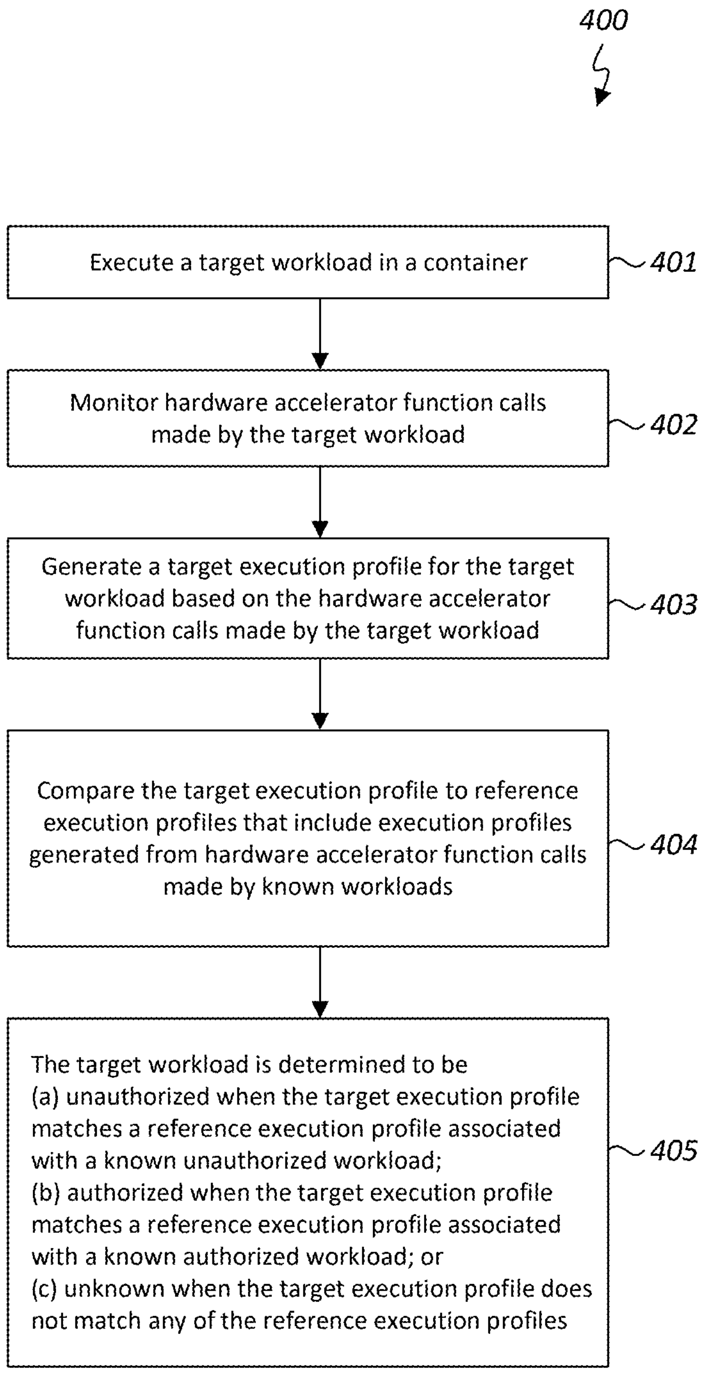
FIG. 5 shows a flow chart of a computer-implemented method of detecting unauthorized workloads in a container environment, in accordance with an embodiment of the present invention.

FIG. 5 shows a flow chart of a computer-implemented method 400 of detecting unauthorized workloads in a container environment, in accordance with an embodiment of the present invention.

In step 401, a target workload is executed in a container.

In step 402, hardware accelerator function calls made by the target workload from within the container are monitored. In one embodiment, the hardware accelerator function calls are GPU function calls. As can be appreciated, other hardware accelerator function calls can also be monitored and processed as described herein, including calls to functions of NPU hardware and other hardware accelerators.

In step 403, a target execution profile is generated for the target workload based on the hardware accelerator function calls made by the target workload. In one embodiment, an execution profile indicates a number of times each of different hardware accelerator functions is called by the target workload during predetermined time intervals.

In step 404, the target execution profile is compared to reference execution profiles that include execution profiles generated from hardware accelerator function calls made by known unauthorized workloads and known authorized workloads. A reference execution profile for a known authorized or known unauthorized workload may be generated by executing the workload in the container, monitoring the function calls made by the workload during time intervals, and generating the reference execution profile of the workload from the function calls made by the workload. A reference execution profile for a known authorized or known unauthorized workload may also be pre-defined by cybersecurity researchers.

In step 405, the target workload is determined to be unauthorized when the target execution profile matches a reference execution profile associated with a known unauthorized workload, authorized when the target execution profile matches a reference execution profile associated with a known authorized workload, or unknown when the target execution profile does not match any of the reference execution profiles. The matching may be in terms of similarity. For example, a target execution profile may be considered to be matching a reference execution profile when the target and reference execution profiles are similar to each other.

In one embodiment, an execution profile of a workload indicates a number of times a particular hardware accelerator function call is called by the workload from within the container during time intervals. A profile score may be generated for the execution profile by DFW. A target execution profile is considered to be matching a reference execution profile when the distance between profile scores generated for the target execution profile and the reference execution profile is less than a predetermined threshold, indicating that the target and reference execution profiles are similar. Depending on the number of reference execution profiles, the reference execution profiles may be loaded in-memory to facilitate comparisons.

Security policies may indicate a mitigation action responsive to detecting a particular workload type. For example, a security policy may indicate terminating an unauthorized or unknown workload. As another example, a security policy may indicate raising an alert responsive to detecting an unauthorized or unknown workload. Raising the alert may include sending a report to a console, logging the detection in a security event log, sending a notification to an administrator, etc.

Figure 6:
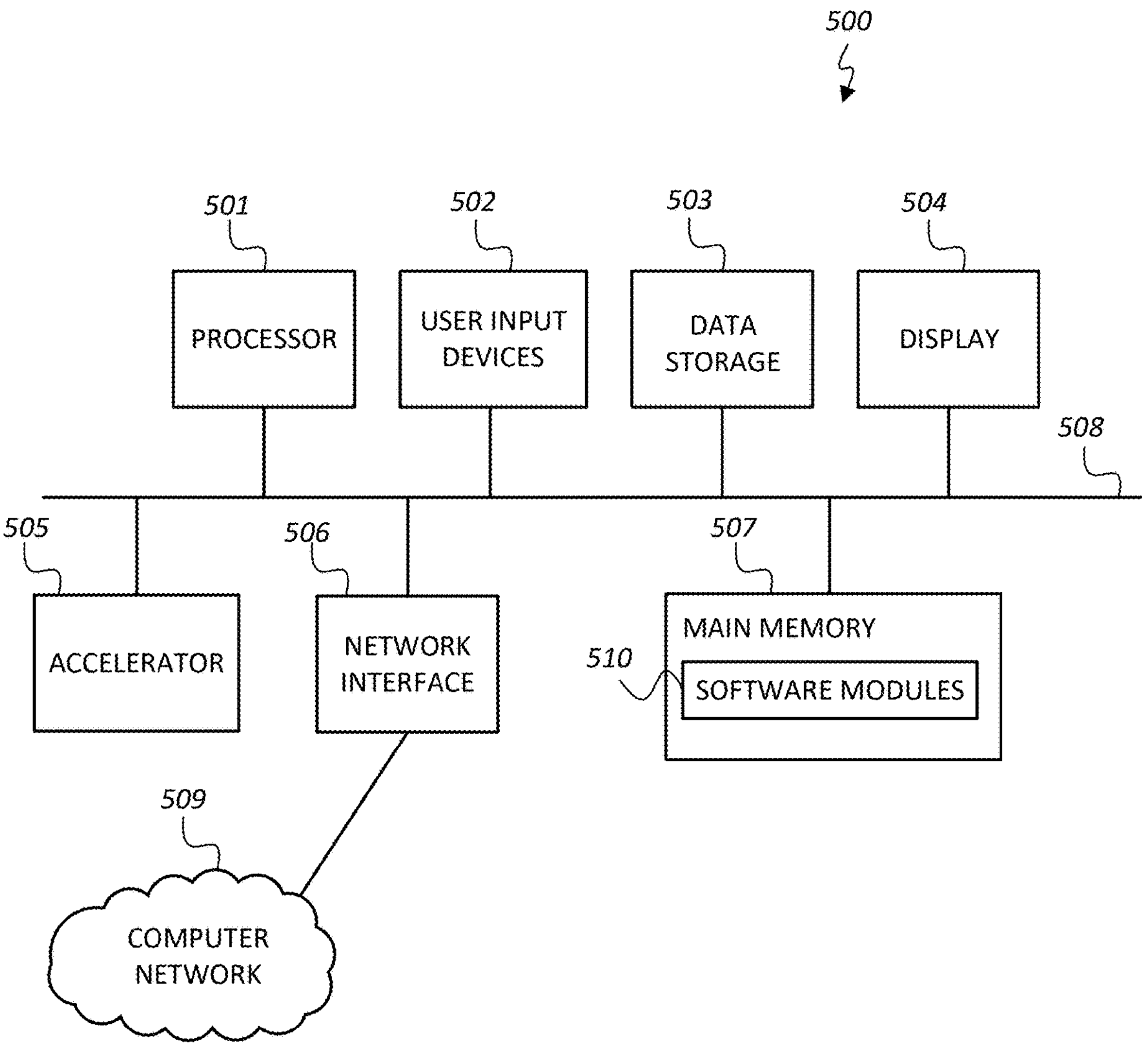
FIG. 6 shows a block diagram of a computer system that may be employed with embodiments of the present invention.

FIG. 6 shows a block diagram of a computer system 500 that may be employed with embodiments of the present invention. The computer system 500 may be employed to execute and monitor container workloads or as other computers described herein. The computer system 500 may have fewer or more components to meet the needs of a particular application. The computer system 500 may include one or more processors 501, one or more user input devices 502 (e.g., keyboard, mouse), one or more data storage devices 503 (e.g., hard drive, optical disk, solid state drive), a display screen 504 (e.g., liquid crystal display, flat panel monitor), one or more hardware accelerators 505 (e.g., GPU, NPU), a computer network interface 506 (e.g., network adapter, modem), and a main memory 507 (e.g., random access memory). The computer system 500 may have one or more buses 508 coupling its various components. The computer network interface 506 may be coupled to a computer network 509, which in this example includes the public Internet.

The computer system 500 is a particular machine as programmed with one or more software modules 510, comprising instructions stored non-transitory in the main memory 507 for execution by at least one processor 501 to cause the computer system 500 to perform corresponding programmed steps. An article of manufacture may be embodied as computer-readable storage medium including instructions that when executed by at least one processor 501 cause the computer system 500 to be operable to perform the functions of the one or more software modules 510. In one embodiment in which the computer system 500 is configured to monitor workloads running in containers, the software modules 510 comprise instructions of a workload analyzer.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of detecting unauthorized workloads in a container environment, the method comprising:

executing a target workload in a container;

monitoring Graphics Processing Unit (GPU) function calls made by the target workload from within the container;

generating a target execution profile of the target workload from the GPU function calls made by the target workload, the target execution profile indicating a number of times the target workload made each of the GPU function calls;

comparing the target execution profile to a plurality of reference execution profiles, wherein the plurality of reference execution profiles includes execution profiles generated from GPU function calls of known unauthorized workloads; and detecting that the target workload is unauthorized responsive to the target execution profile matching a first reference execution profile of the plurality of reference execution profiles, wherein the first reference execution profile is associated with a known unauthorized workload.

2. The computer-implemented method of claim 1, further comprising:

calculating a profile score for the target execution profile;

calculating a profile score for the first reference execution profile; and calculating a distance between the profile score of the target execution profile and the profile score of the first reference execution profile, wherein the target execution profile is determined to match the first reference execution profile when the distance is less than a distance threshold.

3. The computer-implemented method of claim 2, wherein the profile scores of the target execution profile and the first reference execution profile are calculated by Dynamic Time Warping (DTW).

4. The computer-implemented method of claim 1, wherein the target execution profile indicates a number of times the target workload made each of the GPU function calls during predetermined time intervals.

5. The computer-implemented method of claim 1, wherein the target workload is a cryptocurrency mining software.

6. A computer system comprising at least one processor, a memory, and a hardware accelerator, the memory storing instructions that when executed by the at least one processor cause the computer system to:

execute a target workload in a container;

monitor hardware accelerator function calls made by the target workload from within the container;

generate a target execution profile of the target workload from the hardware accelerator function calls made by the target workload;

compare the target execution profile to a plurality of reference execution profiles, wherein the plurality of reference execution profiles includes execution profiles generated from hardware accelerator function calls of known unauthorized workloads; and detect that the target workload is unauthorized when the target execution profile matches a first reference execution profile of the plurality of reference execution profiles, wherein the first reference execution profile is associated with a known unauthorized workload.

7. The computer system of claim 6, wherein the hardware accelerator is a graphics processing unit (GPU) and the hardware accelerator function calls are GPU function calls.

8. The computer system of claim 6, wherein the plurality of reference execution profiles includes execution profiles generated from hardware accelerator function calls of known authorized workloads, and the computer system detects that the target workload is authorized when the target execution profile matches a second reference execution profile of the plurality of reference execution profiles, wherein the second reference execution profile is associated with a known authorized workload.

9. The computer system of claim 6, wherein the instructions stored in the memory when executed by the at least one processor cause the computer system to:

calculate a profile score for the target execution profile;

calculate a profile score for the first reference execution profile;

calculate a distance between the profile score of the target execution profile and the profile score of the first reference execution profile; and determine that the target execution profile matches the first reference execution profile when the distance is less than a distance threshold.

10. The computer system of claim 9, wherein the profile scores of the target execution profile and the first reference execution profile are calculated by Dynamic Time Warping (DTW).

11. The computer system of claim 6, wherein the target execution profile indicates a number of times the target workload made each of the hardware accelerator function calls during predetermined time intervals.

12. The computer system of claim 6, wherein the target workload is a cryptocurrency mining software.

13. A computer-implemented method of detecting unauthorized workloads in a container environment, the method comprising:

executing a target workload in a container;

monitoring hardware accelerator function calls made by the target workload from within the container;

generating a target execution profile of the target workload from the hardware accelerator function calls made by the target workload;

comparing the target execution profile to a plurality of reference execution profiles, wherein the plurality of reference execution profiles includes execution profiles generated from hardware accelerator function calls of known unauthorized workloads; and detecting that the target workload is unauthorized responsive to the target execution profile matching a first reference execution profile of the plurality of reference execution profiles, wherein the first reference execution profile is associated with a known unauthorized workload.

14. The computer-implemented method of claim 13, wherein the hardware accelerator is a graphics processing unit (GPU) and the hardware accelerator function calls are GPU function calls.

15. The computer-implemented method of claim 13, further comprising:

calculating a profile score for the target execution profile;

calculating a profile score for the first reference execution profile; and calculating a distance between the profile score of the target execution profile and the profile score of the first reference execution profile, wherein the distance is less than a distance threshold.

16. The computer-implemented method of claim 15, wherein the profile scores of the target execution profile and the first reference execution profile are calculated by Dynamic Time Warping (DTW).

17. The computer-implemented method of claim 13, wherein the target execution profile indicates a number of times the target workload made each of the hardware accelerator function calls during predetermined time intervals.

18. The computer-implemented method of claim 13, wherein the target workload is a cryptocurrency mining software.

* * * * *